US009602545B2

(12) United States Patent
Pitre

(10) Patent No.: US 9,602,545 B2
(45) Date of Patent: Mar. 21, 2017

(54) ACCESS POLICY MANAGEMENT USING IDENTIFIED ROLES

(71) Applicant: Oracle International Corporation, Redwood Shores, CA (US)

(72) Inventor: Ashutosh Pitre, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 105 days.

(21) Appl. No.: 14/594,690

(22) Filed: Jan. 12, 2015

(65) Prior Publication Data

US 2015/0200943 A1 Jul. 16, 2015

Related U.S. Application Data

(60) Provisional application No. 61/926,892, filed on Jan. 13, 2014.

(51) Int. Cl.
*H04L 29/06* (2006.01)
*G06F 21/45* (2013.01)
*G06F 21/60* (2013.01)

(52) U.S. Cl.
CPC .............. *H04L 63/20* (2013.01); *G06F 21/45* (2013.01); *G06F 21/604* (2013.01); *H04L 63/102* (2013.01)

(58) Field of Classification Search
CPC ........ G06F 21/57; G06F 21/6218; G06F 8/61; G06F 2221/034; H04W 12/08
USPC ..................................................... 726/1, 4, 6
See application file for complete search history.

(56) References Cited

U.S. PATENT DOCUMENTS

| 6,141,778 A | 10/2000 | Kane et al. |
| 6,516,416 B2 | 2/2003 | Gregg et al. |
| 6,754,702 B1 | 6/2004 | Kennelly et al. |
| 7,073,129 B1 | 7/2006 | Robarts et al. |

(Continued)

OTHER PUBLICATIONS

'2 Oracle Identity Manager User Profile Auditing'. Oracle Identity Manager Audit Report Developer's Guide Release 9.0, Part No. B32137-01 [online]. Oracle, 2006 [retrieved Sep. 9, 2014]. Retrieved from the Internet: <URL: http://docs.oracle.com/cd/B32386_01/generic.902/b32137/useraudit.htm>, 9 pages.

(Continued)

*Primary Examiner* — Haresh N Patel
(74) *Attorney, Agent, or Firm* — Kilpatrick Townsend & Stockton LLP

(57) ABSTRACT

The present disclosure relates generally to techniques for automatically associating one or more access policies with an account. Specifically, these techniques enable one or more access policies to retroactively be associated with an account that is not associated with at least one access policy. By associating an access policy with an account, managing access to one or more resources provided by the account may be automated based on the associated access policy. An identity management system (IDM) system may manage access policies for determining access to resources of target systems. Accounts that are not associated with an access policies may be associated with the access policies governing access to resources identified by those accounts. Access to the resource(s) associated with those accounts may be updated based on the access granted by the access policies which are associated with those accounts.

18 Claims, 8 Drawing Sheets

(56) References Cited

U.S. PATENT DOCUMENTS

| | | | |
|---|---|---|---|
| 7,290,288 | B2 | 10/2007 | Gregg et al. |
| 7,581,245 | B2 | 8/2009 | Rojewski |
| 8,266,682 | B2 | 9/2012 | Lee |
| 8,997,240 | B1 | 3/2015 | Kohen et al. |
| 9,069,947 | B2 | 6/2015 | Kottahachchi et al. |
| 9,129,105 | B2 | 9/2015 | Donley et al. |
| 9,152,783 | B2 | 10/2015 | Kottahachchi et al. |
| 9,390,255 | B2 | 7/2016 | Sharma et al. |
| 2002/0095395 | A1 | 7/2002 | Larson et al. |
| 2002/0188869 | A1* | 12/2002 | Patrick ............... G06F 21/6245 726/4 |
| 2003/0056026 | A1 | 3/2003 | Anuff et al. |
| 2003/0101360 | A1 | 5/2003 | Legros et al. |
| 2003/0145074 | A1 | 7/2003 | Penick |
| 2004/0064742 | A1 | 4/2004 | Excoffier et al. |
| 2004/0133876 | A1 | 7/2004 | Sproule |
| 2004/0215610 | A1 | 10/2004 | Dixon et al. |
| 2007/0028258 | A1 | 2/2007 | Wollmershauser et al. |
| 2007/0055602 | A1 | 3/2007 | Mohn |
| 2007/0180504 | A1 | 8/2007 | Hung |
| 2007/0282942 | A1 | 12/2007 | Bailey et al. |
| 2008/0027788 | A1 | 1/2008 | Lawrence et al. |
| 2008/0059804 | A1 | 3/2008 | Shah et al. |
| 2008/0209213 | A1 | 8/2008 | Astrand et al. |
| 2008/0250332 | A1 | 10/2008 | Farrell et al. |
| 2008/0263652 | A1 | 10/2008 | McMurtry et al. |
| 2008/0275851 | A1 | 11/2008 | Taylor et al. |
| 2008/0301460 | A1 | 12/2008 | Miller et al. |
| 2009/0125989 | A1 | 5/2009 | Flaherty et al. |
| 2009/0144183 | A1 | 6/2009 | Gatchell et al. |
| 2009/0240728 | A1 | 9/2009 | Shukla et al. |
| 2009/0276839 | A1 | 11/2009 | Peneder |
| 2010/0131654 | A1 | 5/2010 | Malakapalli et al. |
| 2010/0145718 | A1 | 6/2010 | Elmore et al. |
| 2010/0325687 | A1 | 12/2010 | Iverson et al. |
| 2010/0325705 | A1 | 12/2010 | Iverson et al. |
| 2010/0325707 | A1 | 12/2010 | Iverson et al. |
| 2011/0023107 | A1 | 1/2011 | Chen et al. |
| 2011/0040793 | A1 | 2/2011 | Davidson et al. |
| 2011/0053555 | A1 | 3/2011 | Cai et al. |
| 2011/0083163 | A1 | 4/2011 | Auvenshine et al. |
| 2011/0087766 | A1 | 4/2011 | Kuo et al. |
| 2011/0106835 | A1 | 5/2011 | Lauridsen et al. |
| 2011/0112939 | A1 | 5/2011 | Nelson et al. |
| 2011/0113471 | A1* | 5/2011 | Hjelm ............... H04L 12/66 726/1 |
| 2011/0154464 | A1 | 6/2011 | Agarwal et al. |
| 2011/0185403 | A1 | 7/2011 | Dolan et al. |
| 2011/0209200 | A2 | 8/2011 | White et al. |
| 2011/0213789 | A1 | 9/2011 | Doshi et al. |
| 2011/0247059 | A1 | 10/2011 | Anderson et al. |
| 2011/0265160 | A1 | 10/2011 | Nettleton |
| 2011/0296001 | A1 | 12/2011 | Ramstrom |
| 2011/0307957 | A1* | 12/2011 | Barcelo ............... G06F 21/552 726/25 |
| 2012/0023546 | A1 | 1/2012 | Kartha et al. |
| 2012/0266156 | A1 | 10/2012 | Spivak et al. |
| 2012/0324529 | A1* | 12/2012 | Rangachari ........... G06F 21/604 726/1 |
| 2013/0086060 | A1 | 4/2013 | Donley et al. |
| 2013/0086065 | A1 | 4/2013 | Sharma et al. |
| 2013/0086628 | A1 | 4/2013 | Kottahachchi et al. |
| 2013/0086658 | A1* | 4/2013 | Kottahachchi ......... G06F 21/45 726/6 |
| 2013/0111565 | A1 | 5/2013 | Wen et al. |
| 2013/0125211 | A1* | 5/2013 | Cashman ............... H04L 63/08 726/4 |
| 2013/0276078 | A1 | 10/2013 | Rockwell |
| 2013/0340030 | A1* | 12/2013 | Riley ................... H04L 63/20 726/1 |
| 2013/0347129 | A1 | 12/2013 | Samuelsson et al. |
| 2014/0115718 | A1 | 4/2014 | Kellerman et al. |
| 2014/0137219 | A1 | 5/2014 | Castro et al. |
| 2014/0189808 | A1 | 7/2014 | Mahaffey et al. |
| 2014/0189829 | A1 | 7/2014 | McLachlan et al. |
| 2014/0196104 | A1* | 7/2014 | Chari ................... H04L 63/102 726/1 |
| 2014/0380444 | A1 | 12/2014 | Kelley |
| 2015/0026796 | A1 | 1/2015 | Alan et al. |
| 2015/0082372 | A1 | 3/2015 | Kottahachchi et al. |
| 2015/0082373 | A1 | 3/2015 | Kottahachchi et al. |
| 2015/0082396 | A1 | 3/2015 | Theebaprakasam et al. |
| 2015/0199213 | A1* | 7/2015 | Desai ................... G06F 9/468 718/102 |
| 2016/0315970 | A1 | 10/2016 | Sharma et al. |

OTHER PUBLICATIONS

'What's New in Oracle Identity Manager 11g R2 PS2?'. Datasheet [online]. Oracle, 2014 [retrieved Jan. 12, 2015]. Retrieved from the Internet: <URL: oim-11gr2-whats-new-1709505.pdf>, 2 pages.

'Oracle Identity Manager—11g Release 2 (11.1.2.2)'. Oracle Fusion Middleware Identity Management Release Notes 11g Release 2 (11.1.2.2), Part No. E39887-14 [online]. Oracle, 2014 [retrieved Sep. 8, 2014]. Retrieved from the Internet: <URL: http://docs.oracle.com/cd/E40329_01/relnotes.1112/e39887/id_mgr.htm>, 34 pages.

Register and Mapping definitions in Webster's Third New International Dictionary, Merriam-Webster Inc., 2001, 3 pages.

User definition in Dictionary of Information Security, Syngress Publishing Inc., 2006, 2 pages.

U.S. Appl. No. 13/485,255, Final Office Action mailed on Aug. 25, 2014, 20 pages.

U.S. Appl. No. 13/485,255, Non-Final Office Action mailed on Dec. 19, 2013, 26 pages.

U.S. Appl. No. 13/485,255, Notice of Allowance mailed on Jun. 5, 2015, 5 pages.

U.S. Appl. No. 13/485,327, Final Office Action mailed on Oct. 22, 2014, 14 pages.

U.S. Appl. No. 13/485,327, Non-Final Office Action mailed on Feb. 4, 2014, 22 pages.

U.S. Appl. No. 13/485,327, Notice of Allowance mailed on Apr. 15, 2015, 11 pages.

U.S. Appl. No. 13/485,372, Final Office Action mailed on Sep. 9, 2013, 16 pages.

U.S. Appl. No. 13/485,372, Final Office Action mailed on Jan. 21, 2015, 18 pages.

U.S. Appl. No. 13/485,372, Non-Final Office Action mailed on Jul. 2, 2014, 15 pages.

U.S. Appl. No. 13/485,372, Non-Final Office Action mailed on Feb. 28, 2013, 14 pages.

U.S. Appl. No. 13/485,372, Notice of Allowance mailed on May 4, 2015, 10 pages.

U.S. Appl. No. 13/485,408, Final Office Action mailed on Nov. 4, 2015, 9 pages.

U.S. Appl. No. 13/485,408, Non-Final Office Action mailed on Feb. 27, 2015, 7 pages.

U.S. Appl. No. 13/485,408, Notice of Allowance mailed on Mar. 29, 2016, 16 pages.

U.S. Appl. No. 14/221,203, Final Office Action mailed on Dec. 18, 2015, 19 pages.

U.S. Appl. No. 14/221,203, Non-Final Office Action mailed on Sep. 1, 2015, 17 pages.

U.S. Appl. No. 14/221,203, Non-Final Office Action mailed on May 17, 2016, 19 pages.

U.S. Appl. No. 14/221,209, Final Office Action mailed on Dec. 10, 2015, 15 pages.

U.S. Appl. No. 14/221,209, Final Office Action mailed on Aug. 23, 2016, 20 pages.

U.S. Appl. No. 14/221,209, Non-Final Office Action mailed on Jul. 31, 2015, 14 pages.

U.S. Appl. No. 14/221,209, Non-Final Office Action mailed on Mar. 21, 2016, 17 pages.

U.S. Appl. No. 14/221,217, Non-Final Office Action mailed on Mar. 25, 2016, 9 pages.

U.S. Appl. No. 14/221,203, Final Office Action mailed on Nov. 10, 2016, 21 pages.

(56) References Cited

OTHER PUBLICATIONS

U.S. Appl. No. 14/221,217, Final Office Action mailed on Oct. 20, 2016, 10 pages.

* cited by examiner

ACCESS POLICY MANAGEMENT USING IDENTIFIED ROLES

CROSS-REFERENCES TO RELATED APPLICATIONS

The present application claims priority and benefit from U.S. Provisional Application No. 61/926,892, filed Jan. 13, 2014, entitled "ACCESS POLICY HARVESTING," the entire contents of which are incorporated herein by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates generally to management of enterprise systems and cloud computing systems, and more particularly to techniques for using an access policy to manage accounts for an enterprise system or a cloud computing system.

In the context of information technology (IT) systems, one or more accounts may be provisioned for a user that enable the user to access various resources, for example, various resources within an enterprise system or a cloud computing system. Examples of such resources can include, without limitation, software products, applications (e.g., cloud-based applications, enterprise applications, or any other applications), cloud services, various types of data (e.g., networked files, directory information, databases, or the like), and other resources. In addition to accounts, many enterprises manage access to resources using roles. In a roles-based access system, various roles may be defined in the enterprise system. A role may be associated with one or more access policies that control how resources within the enterprise will be accessed. One or more roles may then be associated with a user or a group of users. The provisioning and management of access rights for a user are automated based on the role(s) associated with the user.

In many enterprises, accounts may be provisioned separately from configuring of access policies. This may lead to situations where accounts providing access to various resources provided by target systems may not be established based on the access policies applicable to those resources. In some instances, accounts may be provisioned before access policies are implemented. As a result, the access to a resource provided by such accounts may not conform to current access policies of an organization. The access provided to a resource by these accounts may be out-dated or not based on a current access policy governing access to the resource. In large enterprises with many users and many different access policies, accounts that have not been associated with an access policy may have to be manually configured to conform those accounts to current access policies corresponding to the resources indicated by those accounts. Many enterprises have changing needs with respect to use of resources by users within these enterprises. Thus, accounts not linked to an access policy may have to be manually configured to adjust access provided by those accounts.

Some enterprises have implemented unsupported solutions or non-scalable custom solutions (e.g., an SQL script) to enable accounts to be associated with an existing access policy. Such attempts may be burdensome and unreliable because they are temporary and must be manually performed to configure accounts based on updates to access policies. In some instances, such solutions are temporary as they do not afford an enterprise the flexibility to handle future change in access policies without performing the additional solutions. Enterprises may benefit for techniques to automatically manage accounts using access policies.

BRIEF SUMMARY

The present disclosure relates generally to techniques for automatically associating one or more access policies with an account. Specifically, these techniques enable one or more access policies to retroactively be associated with an account that is not associated with at least one access policy. Such techniques may be referred to herein as "access policy harvesting." By associating an access policy with an account, managing access to one or more resources provided by the account may be automated based on the associated access policy.

An identity management system (IDM) system may be implemented to manage access to resources (e.g., a hardware resource, a software resource, a data resource, a place, an object, etc.) provided by a computing system. The IDM system may provide administration services to users of an organization include managing administration of identity information about users belonging to one or more organizations. The IDM system may manage access policies to determine access to a resource of a target system. An access policy may indicate an entitlement (e.g., a privilege or a usage right) to use or perform operations with respect to a resource. The IDM system may manage the provisioning of accounts to access a resource based on an entitlement indicated by an access policy.

In some instances, accounts providing access to a resource may have been provisioned to users without implementation of access policies managed by the IDM system. For example, an account may be provisioned to a user without use of an applicable access policy for the resource to which entitlement is granted to the account. The account may have been provisioned before or after the creation of the access policy. In another example, an account may be provisioned to a user based on an entitlement indicated by an out-of-date access policy implemented by another system (e.g., an old IDM system). An organization may desire to have accounts for its users to be managed under existing access policies managed by the current IDM system. An account that is provisioned using an access policy may reduce risks related to compliance for access to a resource and may demand less attention for internal audits because the access to the resource is based on a rule indicated by the access policy.

IDM system may implement access policy harvesting to identify one or more access policies that may be applicable to each account not associated with at least one access policy managed by the IDM system. An access policy may be applicable to an account that indicates an entitlement to a resource managed by the access policy. The accounts not associated with an access policies may be associated with the access policies governing access to resources identified by those accounts. The entitlements associated with those accounts may be updated based on the access granted by the access policies associated with those accounts.

In at least one embodiment of the present invention, techniques may be implemented to associate one or more access policies with an account that is not associated with at least one access policy. The techniques may be implemented by a computing system. The computing system may be included in or may be implemented by an IDM system. In certain embodiments, a method is disclosed. The method may include identifying an account associated with an identity of a user. The account may be associated with an entitlement involving a resource of a target system. The resource may correspond to, for example, an application provided by the target system or a computing system accessible from the target system. The method may include determining that the account is not associated with an access policy. The method may include identifying a role associated with the identity of the user. The method may include determining a set of access policies that grant access to the resource of the target system. Each access policy of the set of access policies may indicate an entitlement to access the resource of the target system by one or more roles. The method may include determining, from the set of access policies, a first access policy that indicates access to the resource by the identified role. The method may include associating the account with the determined first access policy.

In some embodiments, the method may include receiving, from the target system, account data identifying the account, where the account is created by the target system. The account may be created before, after, or concurrently with creation of the first access policy.

In some embodiments, each access policy of the set of access policies is associated with an identifier. Associating the account with the access policy may include storing the identifier corresponding to the first access policy in association with account data identifying the account. The identifier corresponding to the target system may be based on information identifying the resource of the target system and an account identifier corresponding to the account associated with the identity of the user.

In some embodiments, the method may include determining a value of an attribute in access policy data corresponding to the first access policy. The attribute may indicate whether the first access policy may be associated with accounts created for accessing the resource of the target system.

In some embodiments, determining that the account is not associated with an access policy includes: determining policy profile data corresponding to a policy profile associated with the user and determining whether the policy profile data indicates an association between the first access policy and an identifier corresponding to the target system. The account may not be associated with the access policy when the policy profile data does not indicate an association between the first access policy and the identifier corresponding to the resource. In some embodiments, the identifier corresponding to the target system is based on information identifying the resource of the target system and an account identifier that identifies the account associated with the user.

In at least one embodiment of the present invention, techniques may be implemented to associate one or more access policies with an account that is not associated with at least one access policy. The techniques may be implemented by a computing system. The computing system may be included in or may implement an IDM system. The computing system may comprise one or more processors and a memory storing instructions. The instructions, when executed by the one or more processors may cause the one or more processors to perform operations. The operations may include identifying account data corresponding to an account associated with an identity of a user. The account may be a bulk-loaded account or a reconciled account. The account data may be associated with an entitlement involving a resource of a target system. The operations may include receiving, from a target system, data indicating a plurality of accounts created by a target system. The data may include the account data corresponding to the account. The operations may include identifying policy profile data corresponding to a policy profile associated with the identity. The operations may include determining whether the policy profile data indicates an association between an identifier corresponding to the target system and an access policy that grants access to the resource of the target system by a role associated with the identity. The identifier corresponding to the target system may be based on information identifying the resource of the target system and an account identifier corresponding to the account associated with the identity. The operations may include determining that the account is not associated with an access policy when the policy profile data does not indicate an association between the identifier and the access policy that grants access to the resource of the target system. The operations may include determining a set of access policies that grant access to the resource. The operations may include identifying from the set of access policies, a first access policy that indicates access to the resource by the identified role. The operations may include associating the account with an identifier of the first access policy.

Yet other embodiments relate to systems and machine-readable tangible storage media which employ or store instructions for the methods and the operations described above.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
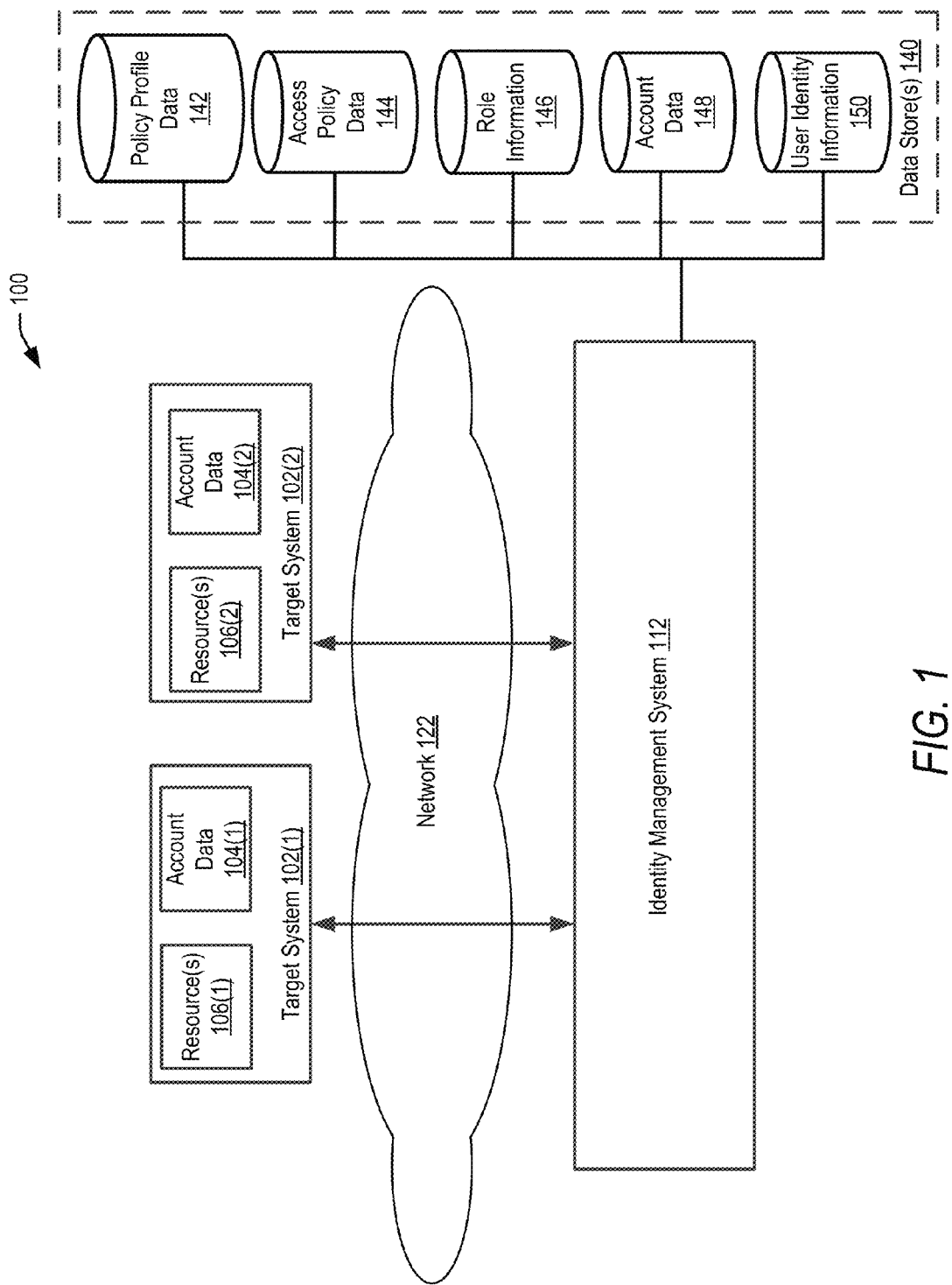
FIG. 1 depicts a computing system according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments (e.g., a computer-program product) to perform the necessary tasks may be stored in a machine-readable medium. As used in this disclosure, a computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The code or instructions may be executed by one or more processing units, where a processing unit can be a processor, a core of a multicore processors, or combinations thereof.

Systems depicted in some of the figures may be provided in various configurations. In some embodiments, the systems may be configured as a distributed system where one or more components of the system are distributed across one or more networks in a cloud computer system.

The present disclosure relates generally to techniques for automatically associating one or more access policies with an account. Specifically, these techniques enable one or more access policies to retroactively be associated with an account that is not associated with at least one access policy. Such techniques may be referred to herein as "access policy harvesting." By associating an access policy with an account, managing access to one or more resources provided by the account may be automated based on the associated access policy.

An identity management system (IDM) system may be implemented to manage access to resources (e.g., a hardware resource, a software resource, a data resource, a place, an object, etc.) provided by a computing system. The IDM system may provide administration services to users of an organization include managing administration of identity information about users belonging to one or more organizations. The IDM system may manage access policies to determine access to a resource of a target system. An access policy may indicate an entitlement (e.g., a privilege or a usage right) to use or perform operations with respect to a resource. The IDM system may manage the provisioning of accounts to access a resource based on an entitlement indicated by an access policy.

In some instances, accounts providing access to a resource may have been provisioned to users without implementation of access policies managed by the IDM system. For example, an account may be provisioned to a user without use of an applicable access policy for the resource to which entitlement is granted to the account. The account may have been provisioned before or after the creation of the access policy. In another example, an account may be provisioned to a user based on an entitlement indicated by an out-of-date access policy implemented by another system (e.g., an old IDM system). An organization may desire to have accounts for its users to be managed under existing access policies managed by the current IDM system. An account that is provisioned using an access policy may reduce risks related to compliance for access to a resource and may demand less attention for internal audits because the access to the resource is based on a rule indicated by the access policy.

IDM system may implement access policy harvesting to identify one or more access policies that may be applicable to each account not associated with at least one access policy managed by the IDM system. An access policy may be applicable to an account that indicates an entitlement to a resource managed by the access policy. The accounts not associated with an access policies may be associated with the access policies governing access to resources identified by those accounts. The entitlements associated with those accounts may be updated based on the access granted by the access policies associated with those accounts.

FIG. 1 depicts a computing system 100 for using access policies to manage accounts for various target systems in accordance with some embodiments of the present disclosure. Computing system 100 may be part of an enterprise system associated with one or more organizations. An organization may have one or more users. Users may be associated with one or more groups in an organization. One or more users may be associated with a role performed within an organization. The role may be associated with one or more responsibilities within the organization. In some embodiments, a role may be associated with a group within an organization, such that users in the group are associated with the role.

Computing system 100 may enable a user to access to one or more resources 106(1) . . . 106(N), respectively, hosted by one or more target systems 102(1) . . . 102(N) (collectively, target systems 102). Although computing system 100 is shown with two target systems 102, any number of target systems may be supported, in other embodiments. One or more resources 106(1) . . . 106(N) may be referred to collectively as resources 106, which are described further below. Although each of target systems 102 is shown with a single resource, any number of resources may be provided by the target system.

Computing system 100 includes identity management (IDM) system 112. IDM system 112 may implement techniques for managing user access to resources provided by one or more target systems. In certain embodiments, IDM system 112 may provide a unified, integrated computing system for managing user identities, enable policy-based automated provisioning of resources to user identities with fine-grained entitlements, and support governance and compliance across the target systems. For example, IDM system 112 may be used by an enterprise to control and manage access to resources provided for the enterprise. An example of IDM system 112 is the Oracle Identity Manager provided by the Oracle® Corporation.

Network 122 may facilitate communications and exchange of data between target systems 102 and IDM system 112. Network 122 may be any type of network familiar to those skilled in the art that may support data communications using any of a variety of commercially-available protocols, including without limitation TCP/IP, SNA, IPX, AppleTalk, and the like. Merely by way of example, network 104 may be an Ethernet network, a Token-Ring network, a local area network (LAN), a wide-area network, a virtual network including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Target systems 102 may be operated by one or more organizations, e.g., a provider of a resource of a target system. A target system may manage provisioning of a resource provided by the target system and may enforce access to the resource. Target systems 102 may be implemented by, for example, general purpose personal computers (including, by way of example, personal computers and/or laptop computers running various versions of Microsoft Windows® and/or Apple® operating systems), cell phones, PDAs or smart phones (running software for a mobile computing environment and/or being Internet, e-mail, SMS, or other communication protocol enabled), workstation computers running any of a variety of commercially-available operating systems, a tablet computer, a desktop computer, a wearable computer, a pager, or any other computing device. For example, target systems 102 may include any other electronic device, such as a thin-client computer, Internet-enabled gaming system, and/or personal messaging device, capable of communicating over a network (e.g., network 122).

Any one of target systems 102 can include one or more memory storage devices and one or more processors. A memory storage device can be accessible to the processor(s) and can include instructions stored thereon which, when executed by the processor(s), cause the processor(s) to implement one or more operations, methods, or processes disclosed herein. A memory storage device may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store account data 104 described below.

In various embodiments, a target system may be configured to execute and operate one or more applications such as a web browser, a client application, a proprietary client application, and the like. The client applications may be accessible or operated via one or more network(s), e.g., network 122.

A resource provided by one of target systems 102 may be one of various resource types, including, but not limited to, a software resource, a hardware resource, a data resource, a service, an application, a physical object, a place, a computing resource, and the like. For example, a target system may be a computing system that provides access to a meeting room using a badge.

In some embodiments, a hardware resource type provided by a target system may include, without limitation, servers, data storage devices, servers, printers, or the like. For example, a target system may be an Active Directory (AD) system that provides access to AD services to access an AD server.

In some embodiments, a software resource type provided by a target system may include, without limitation, a computing program, an application (e.g., cloud-based applications, enterprise applications, or any other applications), a computer-program product (e.g., software), a service (e.g., cloud-based services), or the like. For example, a target system may be an email communication system that provides access to a resource, such as an email service, by a software application.

In some embodiments, a data resource type provided by a target system may include, without limitation, any accessible data objects such as a file (e.g., a networked file or directory information), a database, and the like. For example, a target system may be a data management system that provides access to a cloud-based data store.

Access to one or more resources types provided by a target system may be controlled using various types of accounts provided for that target system. One or more types of accounts may be provisioned for a target system based upon the resources provided by the target system. These account types may include, for example, various user accounts, administrative accounts, application accounts, and the like, with each account type providing a particular level of access to one or more resources provided by the target system. Separate accounts (e.g., user accounts, administrative accounts, and/or application accounts) may be provided for a target system to enable a user to access or otherwise log into the target system. An account may be created, or provisioned, to a user or a group of users (e.g., an organization) based on the identity of the user or the group of users. A user or a group of users may be provided with a particular account type to access a resource type. In one example, an e-mail account on an Exchange server provided to a user may be an account of a resource type Exchange. A user may be given multiple accounts, each corresponding to an account type for a resource type. For example, a user may have two different accounts for logging into a target system to perform different types of operations. For example, a target system may host an Email exchange server and provide an email account type. The same target system may also host an HR system and provide an HR administrator account type for performing administrative functions related to the HR system. A particular user may have an email account on the target system and also have an HR administrative account. When logged in using the email account, the user has access to his/her emails. When logged in using the HR administrative account, the user can perform administrative tasks related to managing resources in an organization.

An account may be associated with an entitlement (e.g., an access privilege or a usage right) to a resource provided by a target system. An entitlement associated with an account may provide a user associated with the account a right (e.g., a privilege or a usage right) to perform an operation with respect to a resource provided by the target system. An operation with respect to a resource may correspond to a functionality or a capability related to use of the resource. An account may control access to a resource type based on the entitlement granted to the resource type by the account. In some embodiments, an account may be assigned multiple entitlements.

In some embodiments, an entitlement to access a resource type may be granted to an account based on a role or responsibility of the user associated with the account. The role or responsibility of a user may one which is defined by an organization.

In some embodiments, an entitlement may be granted to multiple users. An entitlement may be associated with multiple accounts, where each account corresponds to a user identity of a different user. The users may belong to a group within an organization. The group may be associated with a role or may be assigned responsibility within that organization.

In some embodiments, an entitlement to a resource type may be managed by one or more access policies. An access policy may be associated with one or more account types. An access policy may control access to and use of a resource type corresponding to an account type.

Since an access policy controls the access to and use of a resource type, the access policies associated with an account type may control the access rights that a user, having an account of that type, has with respect to the resource type. In some embodiments, an access policy may control access to and use of a resource type by users in an organization according to one or more roles defined by the organization.

Each of target systems 102(1) . . . 102(N) may manage (e.g., store, create, read, update, or delete) account data 104(1) . . . 104(N), respectively. Account data 104(1) . . . 104(N) may be collectively referred to as account data 104. Account data may include information about one or more accounts provided by a target system. Account data may indicate one or more attributes associated with an account such as the owner (user identity) of the account, a start-date and end-date of the account, an account identifier, a login name for the account, a password for the account, and other like information. Account data corresponding to an account may include information related to one or more account types provisioned for an account by the target system. Account data may indicate an association of one or more entitlements to a resource type of a target system.

IDM system 112 may be responsible for managing user access to resources provided by target systems 102. IDM system 112 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing devices that make up IDM system 112 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like.

IDM system 112 may include at least one memory, one or more processing units (or processor(s)), and storage. The processing unit(s) may be implemented as appropriate in hardware, computer-executable instructions, firmware, or combinations thereof. Computer-executable instruction or firmware implementations of the processing unit(s) may include computer-executable or machine-executable instructions written in any suitable programming language to perform the various functions described herein.

The memory in IDM system 112 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). IDM system 112 may also include additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, IDM system 112 may implement one or more data stores 140. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

IDM system 112 may provide identity administration services to users of an organization. The identity administration services may include managing administration of identity information about users (e.g., user identity information 150) belonging to one or more organizations. User identity information 150 may be stored in data store 140. User identity information 150 for a user may include personal information about that user. User identity information 150 may indicate information about a user with respect to an organization. For example, user identity information 150 may indicate one or more positions, roles, responsibilities, or the like of a user in an organization. IDM system 112 may communicate with a client device, an authoritative system, or other computing system associated with an organization to obtain identity information about a user.

IDM system 112 may manage accounts enabling access to one or more resources types provided by any one of target systems 102. IDM system 112 may communicate with target systems 102 to provision accounts to users for resources provided by the target systems 102. For example, IDM system 112 may provide user identity information 150 of a user to a target system (e.g., target system 102(1)) to request provisioning of an account by the target system for the user. In some embodiments, IDM system 112 may provide other information related to a user such as information about the user's association within a group of an organization or a role in the organization.

IDM system 112 may receive account data (e.g., account data 104(1)) corresponding to an account provisioned for a user by a target system (e.g., target system 102(1)). In some embodiments, IDM system 112 may obtain account data from a target system for accounts that have already been provisioned by the target system. The obtained account data (e.g., account data 148) may be stored in data store 140. IDM system 112 may manage account data 148 for an organization. Using account data 148, IDM system 112 can determine one or more accounts associated with a user based on user identity information 150 of a user.

In some embodiments, IDM system 112 may receive account data corresponding to several accounts from a target system. The account data may be received by IDM system 112 via a variety of processes. One such process may be a "bulk-load" process by which account data corresponding to several accounts may be imported into IDM system 112. The bulk-load process may be implemented using a utility application that enables account data to be imported to IDM system 112. Account data may be imported into IDM system 112 from a target system or another other system (e.g., another IDM system) using a bulk-load process. As referred to herein, a bulk-loaded account may correspond to an account for which account data has been obtained through bulk-loading. Bulk-loading may be implemented by an organization to consolidate and/or import a large of volume of accounts from across many target systems. In some embodiments, bulk-loading may be implemented to import account data for accounts that were not previously managed by one or more systems, including a target system or other IDM systems.

Another process for receiving account data may include account reconciliation. Account reconciliation may be implemented by IDM system 112 to reconcile accounts from any one of target systems 102. Through account reconciliation, an account providing access to a resource type of a target system is compared to an account managed for the resource type managed by IDM system 112 to determine differences in the account data. Account reconciliation includes reconciling these differences to determine the appropriate access to the resource type of the target system. In some embodiments, account reconciliation may include merging identities from different accounts into a single, "reconciled" account that provides access for those identities. Account data corresponding to a reconciled account may correspond to account data for an account that is reconciled through the account reconciliation process.

In some embodiments, IDM system 112 may manage (e.g., create, read, update, or delete) information (e.g., role information 146) about users in an organization. Role information 146 may be stored by IDM system 112 in data store 140. Role information 146 may indicate one or more roles defined within an organization. Role information 146 may be defined by an organization for managing access to target systems. Role information 146 may also indicate one or more responsibilities associated with each role and the types of actions that may be performed by a user associated with each of those roles. In some embodiments, one or more roles may be associated with a group within an organization. Role information 146 may indicate relationship between roles, such as a hierarchy of roles. The relationship between roles may be used to determine the type of actions permitted by a role. Role information 146 may obtained from an organization to enable IDM system 112 to manage access to resources provided by target systems supporting the organization.

IDM system 112 may request access to a resource for a user based on role information 146 associated with user identity information 150 of a user. For example, access to a resource by a target system may be requested for a user based on the types of actions permitted by the role associated with the user within an organization. A request to the target system may indicate a type of access to the resource based on the type of actions permitted for the role. As described further below, a role may be associated with one or more access policies that control how resources within an organization will be accessed by the role.

IDM system 112 may manage (e.g., create, read, update, or delete) access policies used to manage access to resources types provided by any one of target systems 102. IDM system 112 may store information about access policies (e.g., access policy data 144) in data store 140. Managing access policies may include storing, querying, and/or retrieving one or more access policies stored in data store 140 (e.g., access policy data 144). In some embodiments, access policies may be managed based on instructions received from a user (e.g., an administrator or operator).

An access policy may indicate factors or criteria for determining an entitlement to access a resource type of a target system. An access policy may be defined by an organization to manage access to one or more resources of a target system utilized for the organization. In some embodiments, an access policy may be defined with respect to a role in an organization or a group of users in an organization, such that users associated with the role or the group may be provided with an entitlement indicated by the access policy. For example, an access policy may, among other things, specify one or more resources types and user or groups to which provisioning of those resource types are allowed or disallowed. As an example, a user such as an employee of the human resources department in an organization could be granted the role of a 'HR Employee.' The 'HR Employee' role may be defined by an access policy that grants the user identity access to a HR employee system with a read privilege (e.g., an entitlement granted to a user identity). Accounts may be updated and/or provisioned with one or more entitlements based on the access policy(s) applicable to the role(s) or groups associated with a user. An account provisioned based on the entitlement indicated by an access policy may be associated with that access policy.

In certain embodiments, IDM system 112 may maintain information about access granted to user identities in one or more policy profiles. Information corresponding to policy profiles may be stored as policy profile data 142. A policy profile may be user-centric such that it includes information about user identities associated with a particular user. A policy profile associated with a user may indicate account data 148 corresponding to one or more accounts associated with a user identity of the user. A policy profile may indicate other information associated with an account of a user, such as one or more access policies that have been used to manage access to the account. IDM system 112 may manage access to the accounts identified in a policy profile based on the access policies indicated in the policy profile. Examples of a policy profile are described with reference to FIG. 3.

In some embodiments, some accounts identified by account data 144 may not be associated with an access policy managed by IDM system 112. The provisioning of these accounts may have been created based on an entitlement not associated with an access policy. In some instances, some accounts may not be associated with an access policy in IDM system 112 because the provisioning of the accounts were requested by another IDM system and/or based on an entitlement indicated by an out-of-date access policy. Account data corresponding to these accounts may have been imported into IDM system 112 by a bulk-load or reconciliation process. An organization may wish to have IDM system 112 manage these accounts under an applicable access policy managed by IDM system 112.

IDM system 112 can identify accounts that are not associated with an access policy. For example, IDM system 112 may automatically search a policy profile of a user to determine whether an account associated with a user identity of that user is associated with an access policy. Upon determining that an account is not associated with an access policy, IDM system 112 may implement "access policy harvesting" to identify one or more access policies that may be applicable to each account not associated with at least one access policy.

IDM system 112 may search access policy data 144 to identify access policies that grant access to one or more resources types indicated by an account not associated with an access policy. The identified access policies may be further examined to determine applicability to an account associated with a user. In some embodiments, an access policy may indicate an entitlement to a role to access a resource type provided by a target system. In such embodiments, an identified access policy may be examined to determine whether the identified access policy indicates access to a resource type for a role associated with a user of the account not associated with an access policy. Based on determining an access policy applicable to an account not associated with at least one access policy, IDM system 112 may request one or more target systems 102 to modify access provided by the account based on the access granted/denied by the access policy applicable to the account. IDM system 112 may periodically evaluate existing access policies to determine whether entitlements granted to an account are proper based on access policies applicable to the resource type indicated by the account. IDM system 112 may request a target system to update access to a resource type provided to an account based on a change in an entitlement for the resource type indicated by an access policy associated with the account.

Upon determining that an access policy that grants access to a resource type indicated by an account of a user not associated with an access policy, IDM system 112 may retroactively associate the account with an identified access policy for managing the resource type. For example, IDM system 112 may store information indicating an association between the identified access policy and the account. The association may be stored in a policy profile of the user.

By associating an account to at least one access policy, an organization may effectively manage a large volume of accounts under central management of IDM system 112. IDM system 112 can automatically perform access policy harvesting for accounts that are not associated with at least one access policy. By doing so, an organization can reduce its expenses and the burden or manually and periodically updating access provided by accounts based on new access policies and updates to existing access policies. An account that is provisioned using an access policy may reduce risks related to compliance for access to a resource and may demand less attention for internal audits because the access to the resource is based on a rule indicated by the access policy. Access to resource types provided by an account may be added, modified, or revoked based on changes to an applicable access policy, which may be identified from the association between the access policy and the account indicated in a policy profile.

In some embodiments, IDM system 112 may discover updates or changes a policy profile of a user. One example of a change is a change in access governed by access policies applicable to the role(s) associated with a user. In some embodiments, the access policies indicated in the policy profile may be compared to the access policies applicable to the role(s) associated with a user. The comparison may indicate whether any access policies in the policy profile have changed or been updated based on the role(s) currently associated with a user. An update, an addition, or a deletion of an access policy may be discovered based on determining a difference based the comparison of access policies. In some embodiments, IDM system 112 may store information indicating a change in access policy data, such as a new, a modified, or a deleted access policy. A policy profile may be updated based on the information indicating the change in access policy data.

IDM system 112 may update a policy profile to indicate new access policies applicable to the role(s) associated with a user. Upon determining a new access policy applicable to a role associated with a user. A new access policy may be analyzed to determine whether that access policy governs access to a resource type by a role associated with a user identity. The policy profile associated with the user identity may be updated to indicate the new access policy for a target system in association with a role associated with the user identity when the access policy is applicable. If no account is provisioned for the target system based on the new access policy, then IDM system 112 may request a target system provision an account for the user based on the entitlement(s) granted by the new access policy.

In some embodiments, IDM system 112 may update a policy profile of a user based on discovery of changes in a role associated with a user or changes in a user's membership to a group. IDM system 112 may update the policy profile for a user to reflect access policies applicable to a user based on a change in a role or a group membership. When a role is removed, the policy profile may be updated to remove access granted by access policies based on the removed role or group membership. When a role is added, the policy profile may be updated to indicate applicable access policies governing access based on the added role. The policy profile may be updated to associate any existing account associated with the user that provides access to the target system identified by the access policy for the added role. If no account is provisioned for the target system based on added role, then IDM system 112 may request a target system to provision an account for the user based on the entitlement(s) granted by the access policies governing access for the added role.

Figure 2:
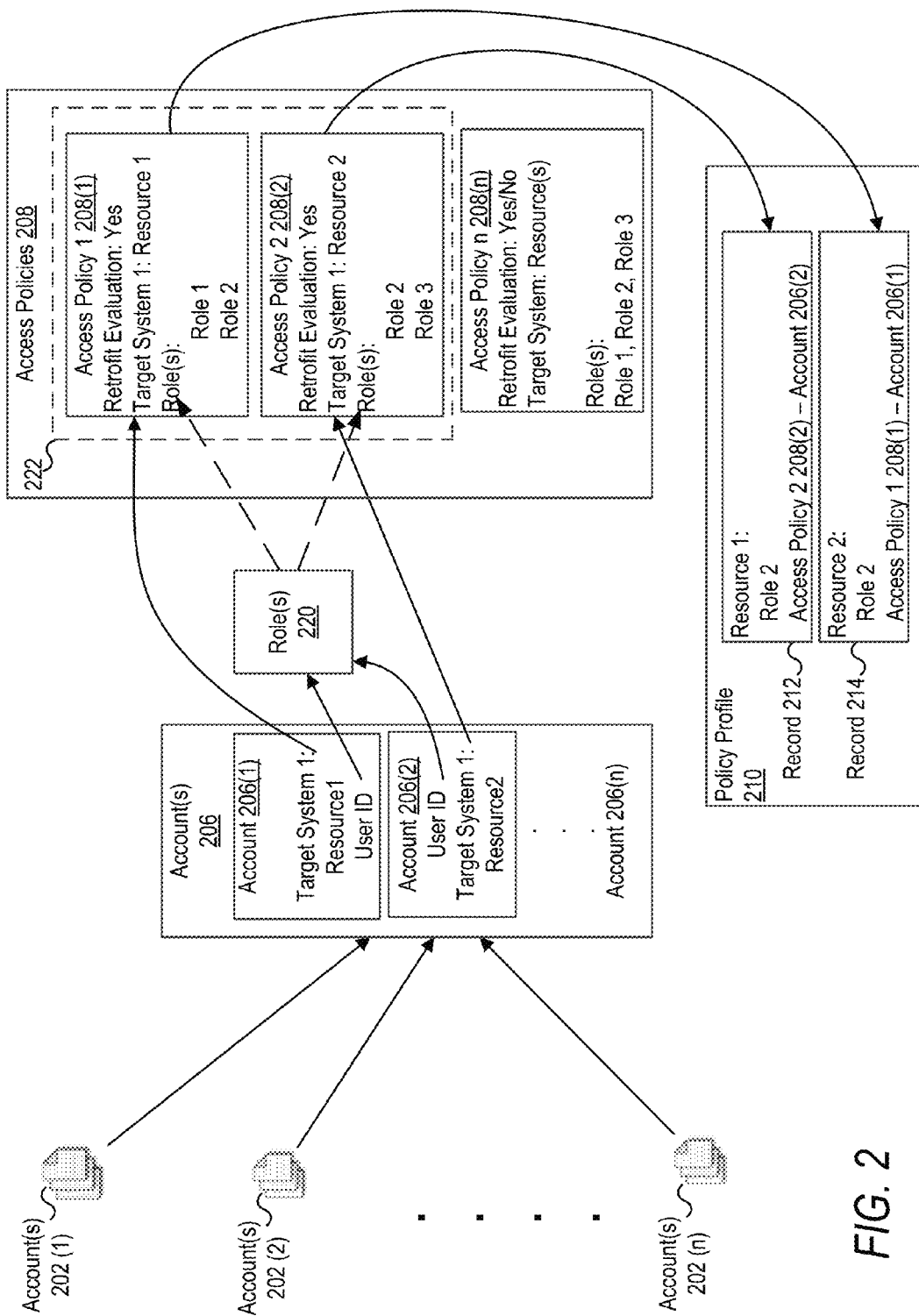
FIG. 2 shows examples accounts associated with one or more access policies managed by an identity management system according to some embodiments of the present invention.

The following examples described with reference to FIG. 2 illustrate some embodiments of IDM system 112 that may implement an automated processes by which a large volume of accounts may be processed and linked to applicable access policies, thereby reducing the need for manual administration of accounts. Accounts that may have been initially created for access to a resource type for one purpose may be adjusted according to the access policies defined by an organization.

In the examples shown in FIG. 2, an enterprise may have any number of accounts, e.g., accounts 202(1), 202(2), . . . 202(n) (collectively, accounts 202). One or more of accounts may be provisioned by any number of target systems. For any number of reasons, the accounts may not be associated with or managed using an access policy managed by an IDM system. For example, some or all of the accounts may have been created by a target system without management by an IDM system. In some embodiments, the accounts may be associated with old or out-dated access policies. The access policies may have been managed by a different computing system, e.g., a different IDM system. In some embodiments, the accounts may have been provisioned by a target system without informing an IDM system. As such, these accounts may not be provisioned according to access policies of an IDM system.

An IDM system (e.g., IDM system 112) may receive account data corresponding to any number of accounts 202 from target systems 102. Account data corresponding to one or more of accounts 202 may be received through a bulk-load or reconciliation process. For example, accounts 206(1), 206(2) . . . 260(n) (collectively, accounts 206) may be identified by account data received from one or more target systems 102. In some embodiments, some of accounts 206 may provide access to a resource provided by the same target system. For example, account 206(1) may provide a user identity with access to a first resource of target system 102(1) and account 206(2) may provide the same user identity with access to a different resource of target system 102(2). Different accounts may be provisioned for a user identity to access different resources based on the role(s) associated with the user identity.

In some embodiments, accounts 206 may not be associated with any one of access policies 208(1), 208(2), . . . 208(n) (collectively, access policies 208) managed by an IDM system. For any number of reasons, accounts 206 may be created before, concurrently with, or after the creation of each of access policies 208. For example, accounts 206 may have been created by target systems 102 before access policies 208 were implemented by IDM system 112. As such, an enterprise may desire to link or to retroactively associate one or more access policies 208 with each of accounts 206 so as to minimize the burden on the enterprise's resources for manually managing compliance of the accounts 206 individually.

In some embodiments, IDM 112 may determine accounts 206 that are not associated with one or more access policies 208. In some embodiments, IDM system 112 may manage a policy profile (e.g., policy profile 210) for one or more user identities, e.g., a user identity indicated by the accounts 206. Policy profile 210 may indicate information about one or more accounts that are associated with a user identity. Based on the policy profile 210, IDM system 112 may determine that some accounts, such as account 206(1) and account 206(2), are not associated with any access policies 208.

In the examples shown in FIG. 2, IDM system 112 may perform access policy harvesting to associate each of accounts 206 with at least one of access policies 208, if applicable to the resource identified by each of accounts 206. In some embodiments, upon determining that all or some of accounts 206 are not associated with an access policy, IDM system 112 may begin access policy harvesting by determining whether any of access policies 208 govern access to a resource indicated by any of accounts 206. In some embodiments, the resource indicated by accounts 206(1), 206(2) may be compared to the resource(s) indicated by each of access policies 208. A set of access policies 222 may be identified from access policies 208 that match a resource indicated by accounts 206(1), 206(2). In one example, access policy 208(1) may be identified for a first resource (e.g., resource 1) indicated by account 206(1) for a first target system (e.g., target system 1). In another example, access policy 208(1) may be identified for a second resource (e.g., resource 2) indicated by account 206(2) for the same target system (e.g., target system 1).

In some embodiments, upon identification of set of access policies 222, set of access policies 222 may be further processed to identify access policies in set of access policies 222 applicable one or more role(s) 220 associated with user identity 204. As explained above, IDM system 112 may manage role information that indicates one or more roles (e.g., role(s) 220) associated with a user identity. IDM system 112 may determine one or more roles associated with an identity of a user indicated by each of accounts 206. In some embodiments, policy profile 210 may indicate the role(s) associated with a user identity indicated by each of accounts 206. The role(s) 220 associated with an identity of a user may be compared to roles indicates by each access policy in the set of access policies 222 to identify access policies applicable to those roles 220 associated with an identity of the user. The identified access policies may be linked to accounts 206(1), 206(2). In some examples shown in FIG. 2, access policy 208(1) (e.g., access policy 1) and access policy 208(2) (e.g., access policy 2) may be identified as applicable to roles 220 matching a role associated with an identity of a user indicated by the accounts 206. In some embodiments, processing may be performed to choose an access policy from the identified access policies applicable to roles 220. An access policy may be chosen from the identified access policies based on a priority corresponding to each of the identified access policies. The priority of an access policy may be defined by an organization, which defines the roles for enabling access based on the access policy. In at least one embodiment, an access policy with the highest priority may be chosen from the identified access policy.

In some embodiments, upon identification of set of access policies 222 applicable to roles 220, each access policy in set of access policies 222 may be linked or associated with one of accounts 206 to be managed by the access policy. For example, policy profile 210 may be updated to include information (e.g., a record) that indicates an association between an access policy and an account. For example, record 212 may be added to policy profile 210 to indicate an association of access policy 208(2) to account 206(2). Record 214 may be added to policy profile 210 to indicate an association of access policy 208(1) to account 206(1). Accounts 206(1), 206(2) are now linked to an access policy.

Linking accounts 206 to one of access policies 208 enables IDM system 112 to determine access for each of accounts 206 based on the criteria indicated by the access policy. By performing access policy harvesting, a large volume of accounts 202 may be automatically managed by IDM system 112 based on access policies of an organization. IDM system 112 may maintain access to those accounts based on roles 220 associated with a user. Access to a resource indicated by an account may be added, modified, or revoked based on modification of an applicable access policy, which may be identified from the association between the access policy and the account. As such, an organization may have to maintain access to a resource by updated access policies rather than manually manage access provided by accounts. IDM system 112 may handle updates to policy profiles based on policy profiles that are linked to the updated access policies.

In some embodiments, one or more of access policies 208 may include an attribute (e.g., retrofit evaluation) that indicates whether an access policy is to be associated with accounts for management of accounts. In some embodiments, an organization may desire to manage accounts individually. When access policies are examined for access policy harvesting, IDM system 112 may examine the attribute in an access policy to determine whether the access policy should be evaluated for linking with accounts.

In some embodiments, IDM system 112 may periodically or intermittently perform access policy harvesting. For example, IDM system 112 may process access policies 208 to determine whether to link any of access policies 208 to any accounts in IDM system 112. For example, any one of access policies 208 may be harvested upon modification of that access policy. In another example, access policy harvesting may be performed each time a new account is discovered by IDM system 112. Access policy harvesting may be performed for access policies for which the attribute ("retrofit evaluation") indicates access policy harvesting is permitted.

Figure 3:
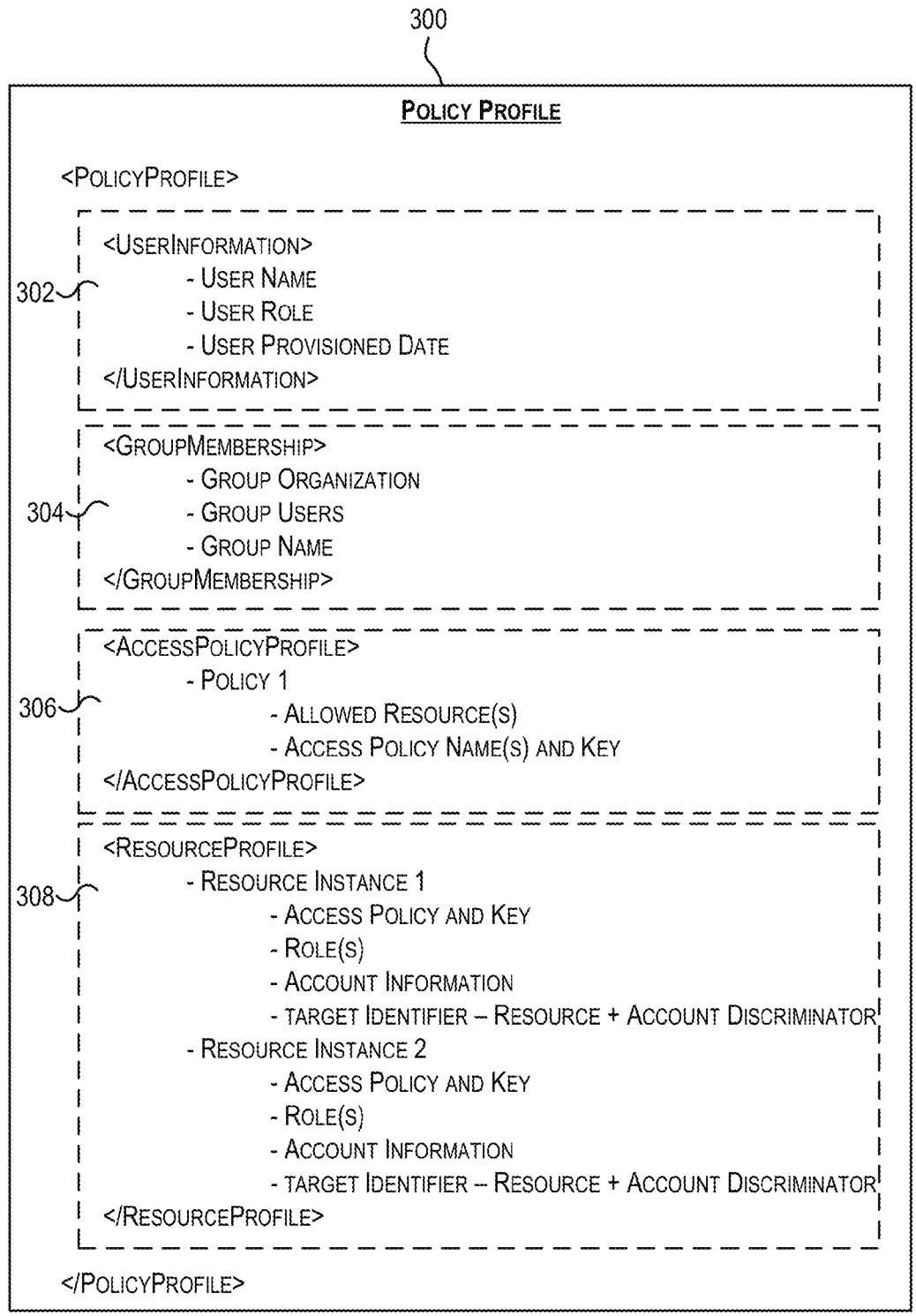
FIG. 3 shows an example of a policy profile according to some embodiments of the present invention.

Now turning to FIG. 3 is an example of policy profile 300 according to some embodiments of the present invention. As explained above, IDM system 112 of FIG. 1, may manage a policy profile (e.g., policy profile 300) for one or more users of IDM system 112. Policy profile 300 may include, among other information about a user, information indicating one or more access policies for managing access to resources provided by target systems for one or more roles associated with a user. IDM system 112 may store policy profile data 142 that includes one or more policy profiles, e.g., policy profile 300. In some embodiments, policy profile 300 may be stored in a data file. The format of the file may correspond to any type of file format, e.g., a structured file format (e.g., XML format), or other type of data file. The contents of policy profile 300 described herein are examples of the type of information IDM system 112 may store in policy profile 300. Policy profile 300 may include more or fewer categories of information, which may be arranged in a different manner than shown in FIG. 3.

In some embodiments, policy profile 300 may include user information 302 that indicates an identity of the user of IDM system 112. User information 302 may include a user name ("user name") and/or other information identifying a user (e.g., userid, login information, or the like). User information 302 may include one or more roles ("user roles") associated with the user. The role(s) may be defined and assigned to the user by IDM system 112. User information 302 may include account information corresponding to an account created by IDM system 112 for the user. The account information may indicate information related to provisioning of the account by IDM system 112.

Policy profile 300 may include group membership information 304 ("Group Membership") indicating an association of a user to one or more groups. Group membership information 304 may indicate one or more groups ("Group Organization") to which the user is associated. The groups may be associated with an organization or an entity providing access to one or more target systems. In some embodiments, group membership information 304 may indicate one or more users of the group organization and other information (e.g., group name) identifying the group organization. In some embodiments, access to a target system may be managed based a user's association with a group organization.

Policy profile 300 may include access policy information 306 ("access policy profiles"). Access policy information 306 may identify one or more access policies managed by IDM system 112. In some embodiments, the access policies identified in policy profile 300 may correspond to the access policies applicable to a user associated with policy profile 300. In some embodiments, access policy information 306 may include one or more access policies and information (e.g., an entitlement) indicating one or more resources ("allowed resources") for which access is governed by those access policies. Access policy information 306 may include policy information that identifies the access policies by name and an identifier (e.g., a "key").

Policy profile 300 may include resource profile information 308 that indicates one or more resources accessible to a user associated with policy profile 300. Resource profile information 308 may indicate one or more resources to which the user is granted an entitlement based on a role associated with the user. For example, resource profile information 308 may indicate information (e.g., a "resource instance") corresponding to each resource that a role associated with the user may be entitled to access. A resource instance (e.g., "Resource Instance 1" or "Resource Instance 2") may indicate an access policy governing access to a resource to which a user is entitled to access based on a role associated with the user. A resource instance may indicate one or more access policies that define an entitlement for a resource by a role associated with the user. A resource instance may indicate one or more roles entitled to access the resource. A resource instance may indicate account information for an account provisioned to the user for a resource based on an entitlement granted by an access policy.

In some embodiments, account information corresponding to a resource instance may be associated with an identifier (e.g., a target identifier). The identifier may be used to identify an account for a resource when multiple accounts for a resource are associated with a user. The identifier may include information indicating the resource and a key (e.g., an account discriminator) that is unique for an account. The account discriminator may be created by the target system from which an account is created to distinguish accounts created by the target system. The identifier may be used by an IDM system to identify an account associated with an access policy for a resource.

Figure 4:
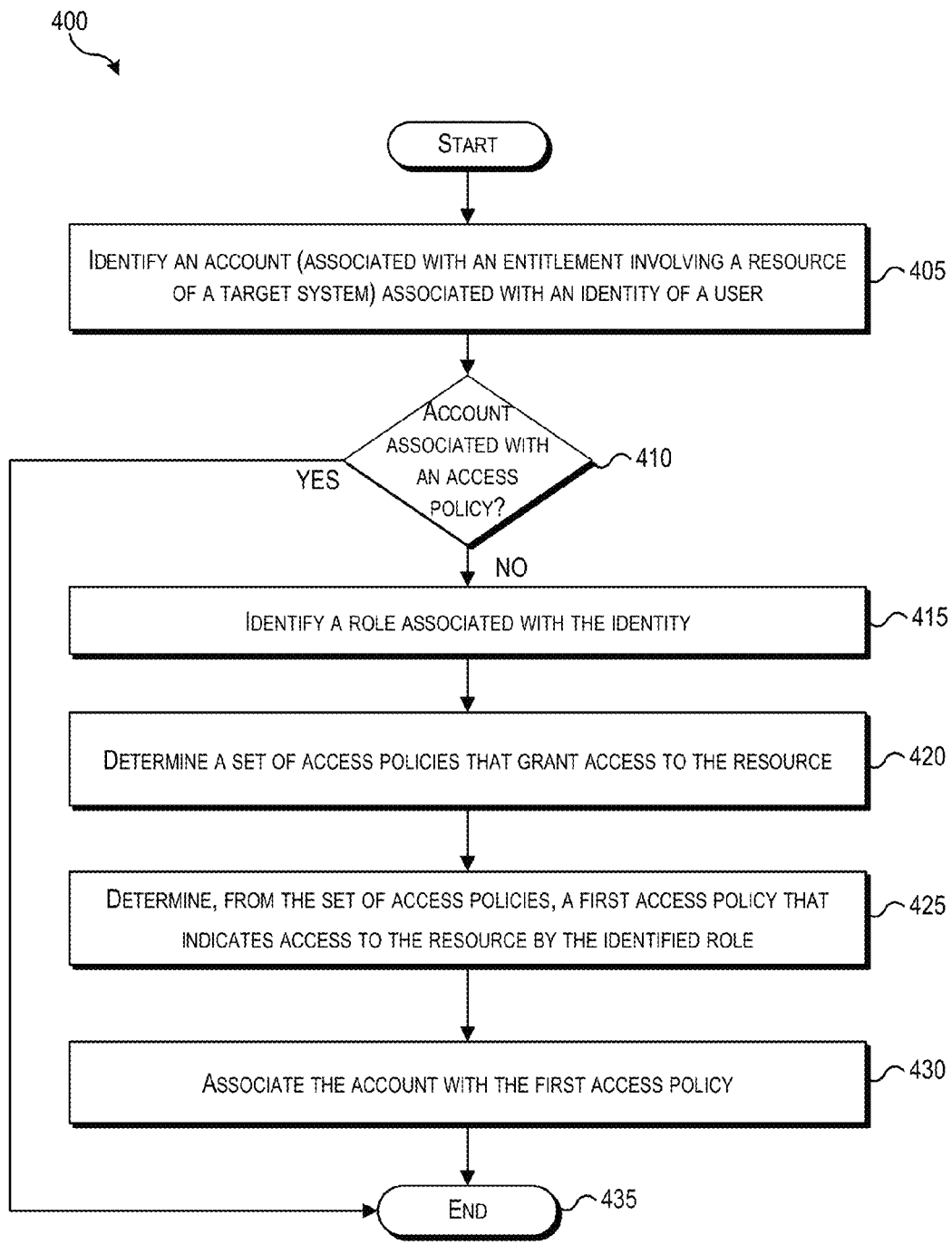
FIG. 4 depicts a flowchart illustrating a process for associating an account for a target system with one or more access policies according to some embodiments of the present invention.

FIG. 4 depicts a flowchart 400 illustrating a process for associating an account for a target system with one or more access policies according to some embodiments of the present invention. For example, the process depicted in flowchart 400 may be performed by IDM system 112 in FIG. 1 to associate an account on a target system with an access policy implemented by IDM system 112.

In certain embodiments, the method depicted in FIG. 4 and described below may be used to associate access policies implemented by an IDM system with bulk-loaded and/or reconciled accounts of target systems. By associating an access policy with accounts, an organization can reduce or eliminate manual administration of accounts based on access policies of the organization. Administrative efforts to manually manage compliance of entitlements to resources by individual accounts including bulk-loaded and reconciled accounts can be reduced. An account can be automatically updated based on an associated access policy to reflect entitlements for a given role of a user associated with the account.

The process depicted by flowchart 400 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps of flowchart 400 is not intended to be limiting. While processing depicted in FIG. 4 is with respect to a single account and a single resource, the processing may be performed for multiple accounts, each of which is not associated with an access policy. Further, processing described with reference to FIG. 4 may be performed for each resource identified by an account. In one embodiment, the process depicted by flowchart 400 may be performed by IDM system 112 of FIG. 1.

The process in flowchart 400 may begin at 405 by identifying an account associated with an identity of a user. For example, the account identified in 505 may be a bulk-loaded account or a reconciled account for the user. The identified account may indicate an entitlement involving a resource of a target system (e.g., one of target systems 102).

In some embodiments, an account associated with an identity of a user may be identified in account data 148 managed by IDM system 112. In some embodiments, an account associated with an identity of a user may be identified in account data 104 received from one of target systems 102. Such account data 104 may correspond to bulk-loaded or reconciled accounts. An account may be identified in account data based on an identity of a user of IDM system 112. Account data may be processed to compare user information (e.g., a user identifier or login information) in the account data to identify a user of IDM system 112. An account may be identified in account data based on determining a match between the identity of the user and account data corresponding to an account.

At 410, processing may be performed to determine whether an account (e.g., the account identified at 405) is associated with an access policy. To determine whether an account is associated with an access policy, an IDM system may search stored access policies to determine whether any access policy exist that are used to manage access to a resource for an entitlement granted to the account. In some embodiments, account data corresponding to an account may be processed to determine resource information (e.g., a resource identifier or resource name) in the account data identifying a resource of a target system (e.g., one of target systems 102). Access policy data (e.g., access policy data 144) corresponding to access policies may be processed to determine whether an access policy identifies a resource that matches the resource information for the account. Upon identifying an access policy that identifies a matching resource, a determination may be made to whether the access policy is associated with the account. It may also be determined that an account is not associated with an access policy when an access policy cannot be identified based on the resource.

In some embodiments, a user policy profile associated with an identity of the user may be searched to determine whether the account is identified in the policy profile and if so, whether it is associated with an access policy.

Upon determining that an account is not associated with an access policy, processing may continue to 415. Upon determining that an account is associated with an access policy, processing may proceed to end at 435.

At 415, a role may be identified for the identity of the user associated with an account (e.g., the account identified at 405). In some embodiments, a role may be identified for an identity of a user based on access granted to the user for an IDM system (e.g., IDM system 112). For example, a role may be identified based on an account provided by IDM system 112. The account information for the account provided by an IDM system may indicate one or more roles associated with the user or information that can be used to determine one or more roles of the user. A role may be assigned to a user based on access granted to the user by the account for the IDM system. In some embodiments, a role of a user may be determined based on actions or operations performed by the user for the IDM system.

A set of access policies in an IDM system are determined at 420. The set of access policies may grant access to a resource of a target system (e.g., a resource associated with an entitlement of an account of a user). In one example, the set of access policies may be identified in access policy data 148 stored by IDM system 112. The set of access policies may be identified based on the resource(s) for which an entitlement is granted to an account of a user (e.g., an account identified at 405). In some embodiments, each access policy of the set of access policies may indicate access entitled to a set of roles. Each role of the set of roles may be identified by IDM system for use of the IDM system.

At 425, processing may be performed to determine an access policy that indicates access to a resource by an role. The access policy may be determined from a set of access policies, e.g., the set of access policies determined at 420. For example, access policy data 148 corresponding to a set of policies may be processed to identify at least one access policy that grants access to a resource (e.g., a resource indicated by an entitlement of an account identified at 405) by a role associated with an identity of a user (e.g., the role identified at 415). In some embodiments, the access policy may be determined based on a priority corresponding to each of the set of access policies. An access policy may be identified from the set of access policies based on a comparison of the priority corresponding to each of the set of access policies. For example, the access policy associated with the highest priority may be identified from the set of access policies to be associated with the account. As explained above, the priority of an access policy may be defined by an organization that enables access to the resource controlled based on the access policy.

An account (e.g., an account identified at 405) may be associated (e.g., "linked to") with an access policy at 430. The access policy may be an access policy determined at 425. In some embodiments, a policy profile associated with a user may be stored with information indicating the association of the account to the access policy determined at 425. As explained above, IDM system 112 may manage a policy profile associated with a user (e.g., policy profile 300), which indicates an access policy governing entitlements to one or more resources granted to an account associated with a user. Processing may end at 435.

In some embodiments, each access policy of a set of access policies (e.g., the set of access policies determined at 420) may be associated with an identification key. The access policy determined at 425 may be associated with an account by storing, in a policy profile associated with the user, the identification key with the account data corresponding to the account. For example, the identification key may be stored in a policy profile in association with account data for an account to be associated with an access policy. The identification key may be stored in association with resource information corresponding to a resource identified by account data.

It will be appreciated that processing performed with respect to flowchart 400 is illustrative and that variations and modifications are possible. Steps described as sequential may be executed in parallel, order of steps may be varied, and steps may be modified, combined, added or omitted. In certain embodiments, processing described with reference to FIG. 4 may be implemented when an IDM system (e.g., IDM system 112) receives account data from one or more target systems. Such account data may be received before, after, or concurrently with creation of an access policy for governing access to resources of the target systems. In some embodiments, processing described with reference to FIG. 4 may be implemented when an access policy is created or modified such that it may be used to govern an entitlement to a resource provided by an existing account. The processing following flowchart 400 may be performed to link the modified or created access policy with the existing account.

Figure 5:
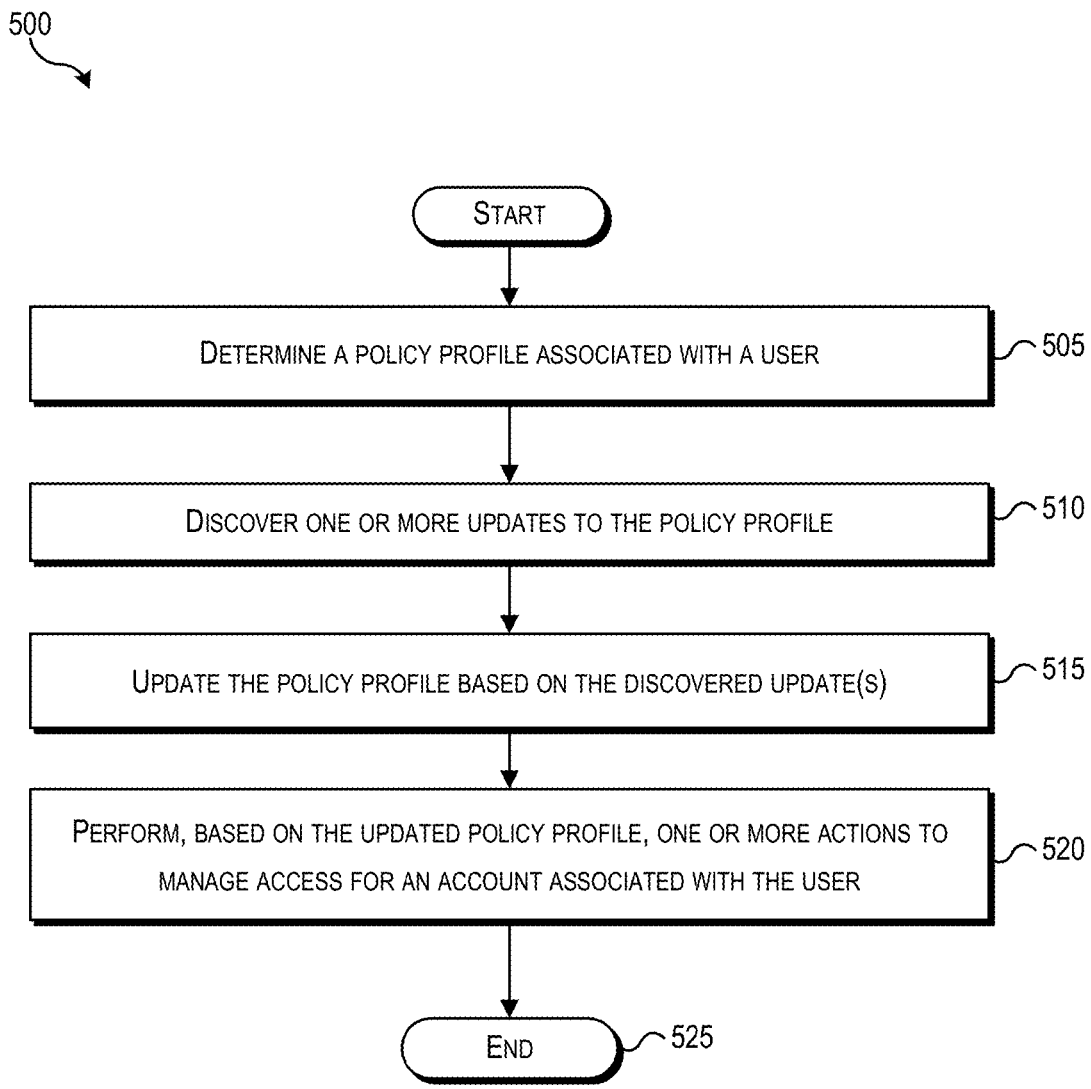
FIG. 5 depicts a flowchart illustrating a process for using a policy profile to manage access provided by an account according to some embodiments of the present invention.

FIG. 5 depicts a flowchart illustrating a process for using a policy profile to manage access provided by an account according to some embodiments of the present invention. Flowchart 500 depicts a process that may be implemented to use a policy profile to manage accounts for target systems. Specifically, a policy profile associated with a user may indicate one or more access policies applicable to a role associated with the user. Techniques described with reference to FIG. 4 may be implemented to discover access policies for managing bulk-loaded and/or reconciled accounts of target systems. Such techniques may enable an IDM system (e.g., IDM system 112 of FIG. 1) to update accounts providing access to resources of a target system based on discovery of changes in access policies for those resources.

The process depicted by flowchart 500 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps of flowchart 500 is not intended to be limiting. In one embodiment, the process depicted by flowchart 500 may be performed by IDM system 112 of FIG. 1.

The process in flowchart 500 may begin at 505 by determining a policy profile associated with a user. A policy profile may be associated with a user based on an association between the policy profile and an identity of the user. The identity may be one provided by an IDM system. In some embodiments, policy profile of a user may be determined by identifying a policy profile of the user in policy profile data 142. Policy profile data 142 may be located using a user identity of the user. User information (e.g., user information 302) in each policy profile may be compared to the user identity to identify a matching policy profile for the user. FIG. 3 depicts an example of policy profile of a user managed by IDM system 112. In some embodiments, determining a policy profile may include generating a policy profile for a user when a policy profile has not been created for the user.

At 510, one or more updates to a policy profile (e.g., the policy profile determined at 505) may be discovered. An update to a policy profile may correspond to an update (e.g., an addition, a deletion, or an update) to an access policy indicated by a policy profile.

In some embodiments, an update to a policy profile may be discovered by comparing information about each access policy in the policy profile to access policy data (e.g., access policy data 144) stored by an IDM system (e.g., IDM system 112). An update may be determined based on identifying a difference between an access policy in a policy profile and access policy data corresponding to the access policy. An access policy that no longer exists may be discovered when the access policy cannot be identified in the access policy data.

In some embodiments, an update to a policy profile may be discovered by generating a new policy profile for a user based on one or more roles of the user and comparing the new policy profile to a policy profile (e.g., a previous policy profile). Policy profile data 142 corresponding to the previous policy profile may be retrieved by an IDM system. An update may be discovered based on determining differences between the new policy profile and the previous policy profile. In some embodiments, the new policy profile may have more or fewer access policies based on the roles associated with a user. As explained above, a policy profile may store information about access policies based on the roles associated with a user. As such, the addition or disassociation with a role may be reflected by changes to access policies identified in the new policy profile. Such changes may be identified as updates to the policy profile.

At 515, the policy profile associated with a user may be updated based on the discovered update(s) to the policy profile. An access policy that has changed for a role associated with a user may be updated in the policy profile based on the discovered update to the access policy. New or non-existent access policies for a role associated with a user may be updated in the policy profile. A policy profile may be updated by modifying policy profile data corresponding to the policy profile to indicate access policy data corresponding to the discovered update(s). In some embodiments, an updated policy profile may correspond to a new policy profile that is generated. The new policy profile may include unchanged access policies from the previous policy profile and access policies that have changed according to the discovered update(s).

At 520, one or more actions may be performed, based on the updated policy profile, to manage access for one or more accounts associated with a user. The one or more actions may be performed to manage access to a resource of a target system granted by an account. The action(s) may include requesting an account, provisioning an account, revoking an account, and modifying an account. As explained above, a policy profile associated with a user may indicate one or more access policies that govern access to a resource of a target system by a role associated with that user. An account providing access to a resource of a target system may be provided based on an access policy that grants an entitlement to the resource. The access policies in the updated policy profile may be used to determine resources that the user is entitled to access. An entitlement granted to an account to access a resource may be updated based on updates to an access policy identified using the updated policy profile. Process 500 may end at block 525.

In some embodiments, an action performed at 520 may include requesting or provisioning an account for a user based on an access policy identified in the updated policy profile. An IDM system that manages the policy profile of a user may request a target system to provision an account for a user based on an updated access policy or a new access policy in the updated policy profile.

In some embodiments, an action performed at 520 may include revoking access to a resource by an account based on the change in access granted by an access policy identified in the updated policy profile. An account may be revoked for a user based on a change in access to a resource indicated by an access policy in the updated policy profile. The change in access may correspond to access to a resource being revoked for a role. The change in access may correspond to a loss of entitlement to access the resource.

In some embodiments, an action performed at 520 may include updating an account provisioned for the resource based on the change to the access policy identified in the updated policy profile. An account may be modified for a user based on an update in access granted by an access policy in the updated policy profile. The update in access may correspond to a change in access to a resource granted by an entitlement.

In some embodiments, an action performed at 520 may include modifying the updated policy profile to associate an account (e.g., a bulk-loaded account or a reconciled account) with an access policy. In some instances, an account for a target system may have previously been created, but may not be associated with an access policy. An update in the updated policy profile may indicate that the access policy is to govern access by a role associated with a user to a resource of a target system. Based on the update to the updated policy profile, the access policy may be used to manage access to a target system. As such, when an account for the target system already exists, the updated policy profile may be modified to associate the existing account with the access policy governing access entitled to a user of the account. Such techniques may avoid creation of a new account for the target system and/or may enable an existing account to be managed using an access policy of an IDM system. Techniques for associating an access policy with an account are described with reference to FIGS. 2 and 4.

It will be appreciated that processing performed for flowchart 500 is illustrative and that variations and modifications are possible. Steps described as sequential may be executed in parallel, order of steps may be varied, and steps may be modified, combined, added or omitted. In certain embodiments, processing described with reference to FIG. 5 may be implemented when an IDM system (e.g., IDM system 112) detects a change in an access policy or an addition of an access policy, either of which may govern access to a resource of a target system by a role. In some embodiments, processing described with reference to FIG. 5 may be implemented when account data corresponding to one or more accounts (e.g., bulk-loaded accounts or reconciled accounts) is received from a target system. As such, a policy profile may be updated to indicate a modification to an account to be managed by an access policy identified in the policy profile. Existing access policies may be identified for managing existing accounts. The processing following flowchart 500 may be performed to link the modified or created access policy with an existing account.

Figure 6:
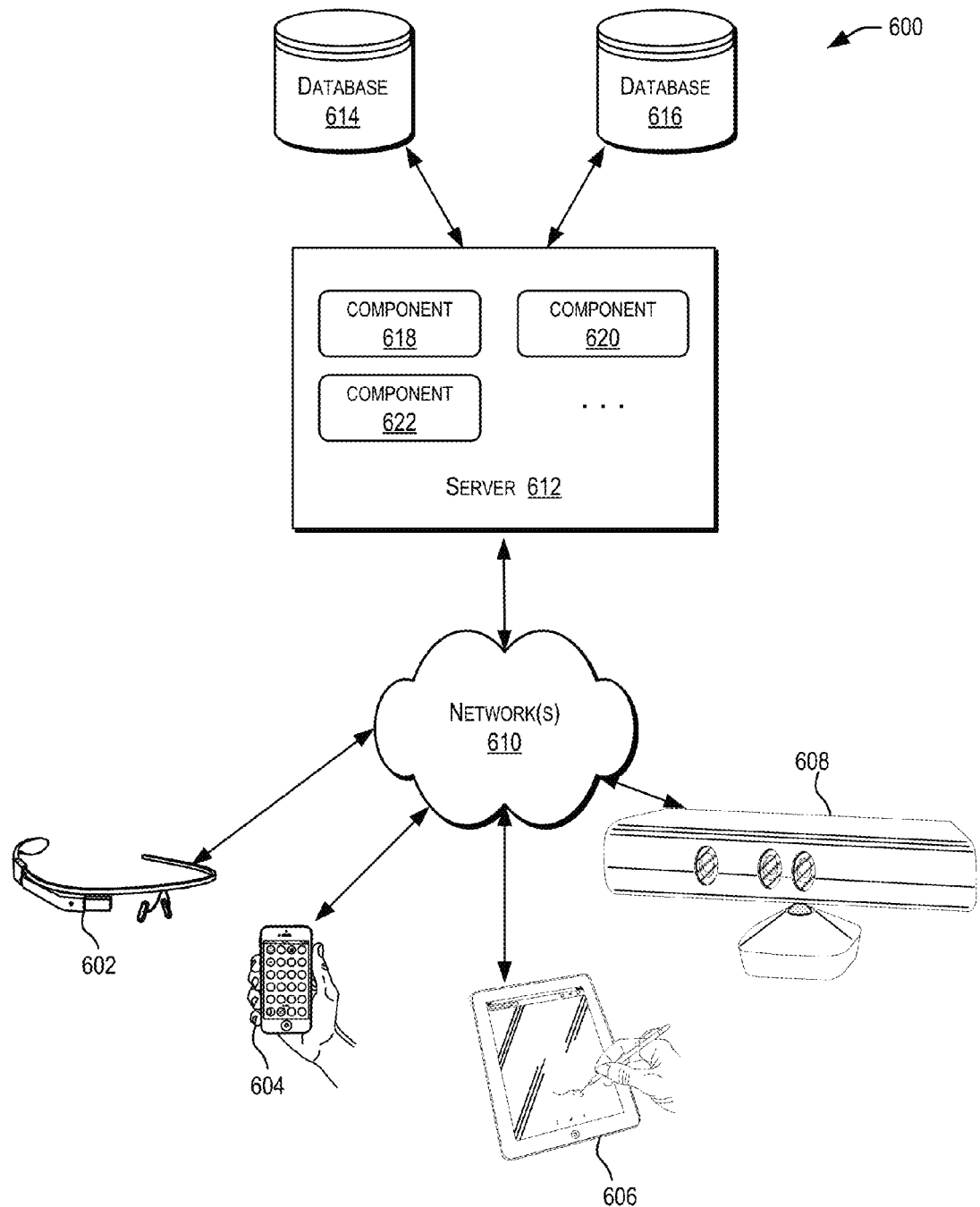
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications such as services and applications that use access policies to manage accounts involving entitlements to a resource of a target system. In certain embodiments, server 612 may also provide other services or software applications can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
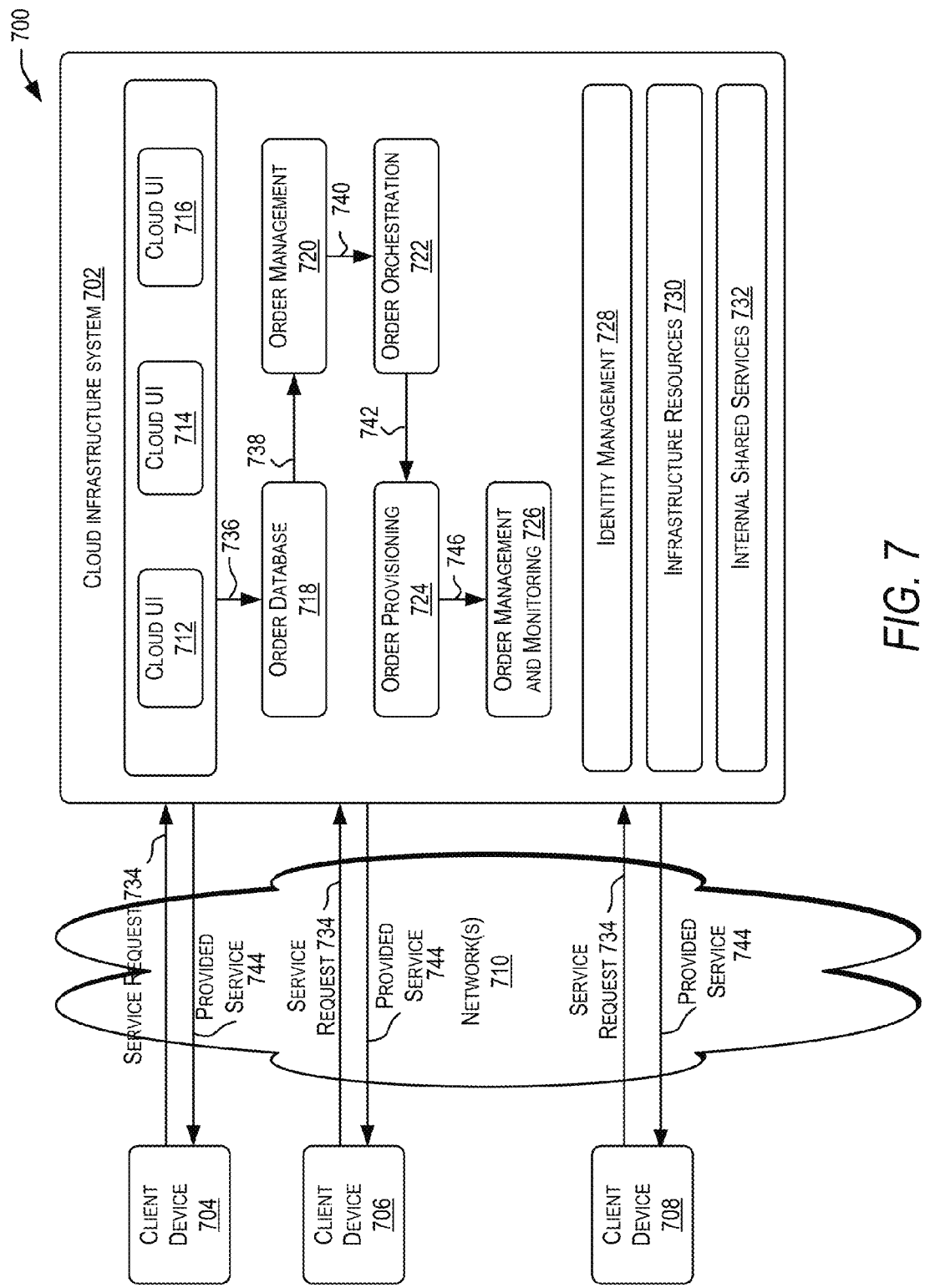
FIG. 7 is a simplified block diagram of one or more components of a system environment in which services may be offered as cloud services, in accordance with an embodiment of the present disclosure.

In some embodiments, a cloud environment may provide one or more services for automating a process of associating an access policy with an account that provides access to a resource of a target system. Specifically, services may be offered to associate an access policy with an account that has not been associated with an access policy. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for using an access policy to manage an account for accessing a resource of a target system. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to using access policies to manage accounts for accessing a resource of a target system, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
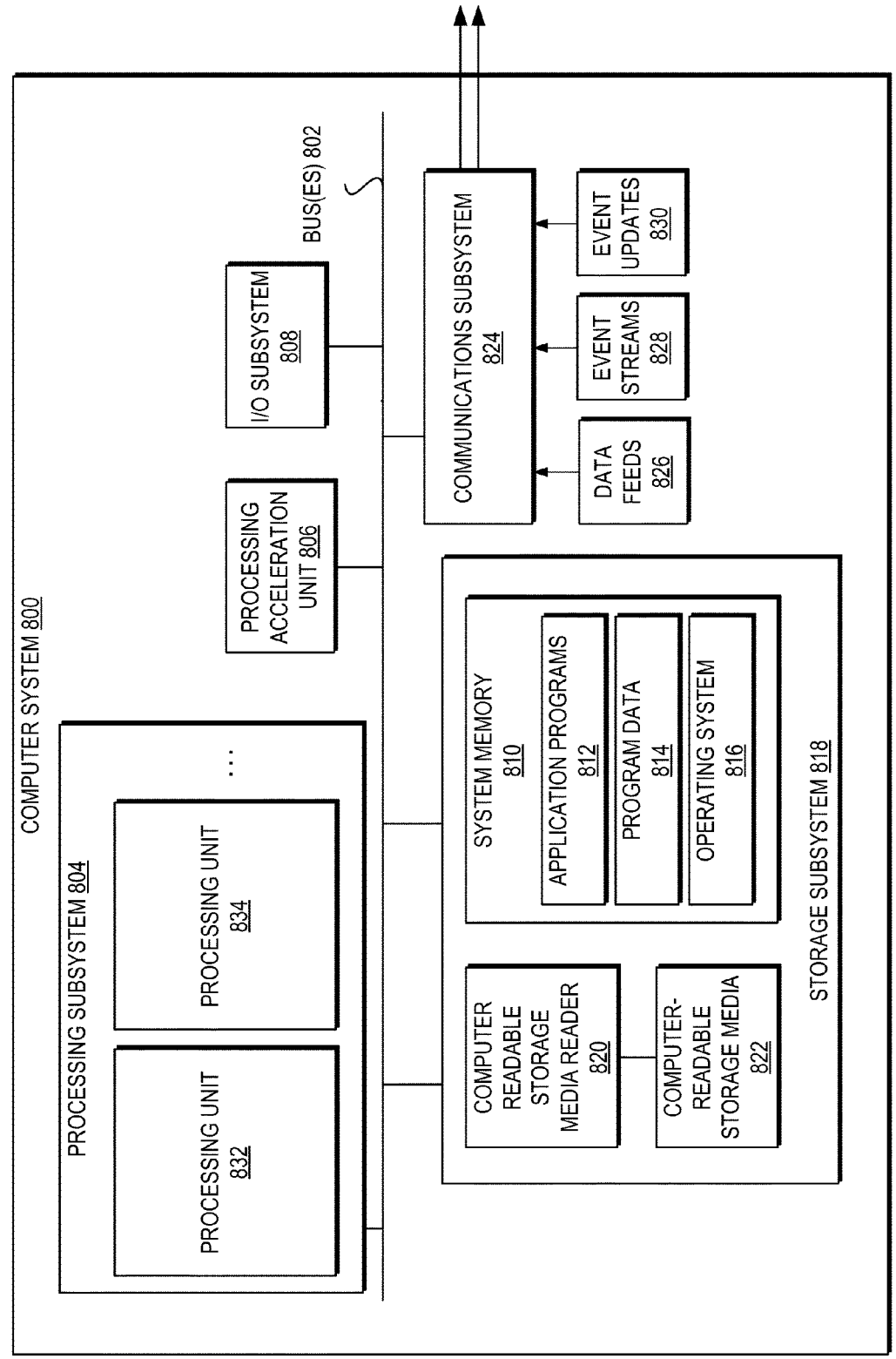
FIG. 8 illustrates an exemplary computer system that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for using access policies to manage accounts for accessing a resource of a target system.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, IDM system 112 of FIG. 1 may receive account data 104 from target systems 102 using communication subsystem 824.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   identifying, by a computer system, an account associated with an identity of a user, wherein the account has an entitlement to access a resource of a target system;
   determining, by the computer system, a set of access policies that are used to manage access to one or more resources of the target system;
   determining, by the computer system, that the account is not managed by an access policy in the set of access policies;
   identifying, by the computer system, a role associated with the identity;
   determining, by the computer system, a first access policy in the set of access policies, the first access policy being determined as associated with the identified role;
   determining a value of an attribute in access policy data corresponding to the first access policy, wherein the value of the attribute indicates whether the first access policy is to be associated with one or more accounts enabling access to the resource of the target system;
   storing, by the computer system, data indicating an association between the account and the first access policy based on determining that the identified role is associated with the first access policy and based on the value of the attribute;
   detecting a change in the first access policy, wherein the change is associated with the access to the resource of the target system; and
   sending, by the computer system, a request to the target system, wherein the request causes the target system to configure the account to change the access to the resource based on the detected change in the first access policy.

2. The method of claim 1, further comprising:
   receiving, from the target system, account data identifying the account, wherein the account is created by the target system.

3. The method of claim 1, wherein each access policy of the set of access policies indicates an entitlement to access the resource of the target system by one or more roles.

4. The method of claim 1, wherein the account is created before the first access policy is created.

5. The method of claim 1, wherein the account is created after the first access policy is created.

6. The method of claim 1, wherein each access policy of the set of access policies is associated with an identifier, and wherein associating the account with the first access policy includes storing the identifier corresponding to the first access policy in association with account data corresponding to the account.

7. The method of claim 1, wherein the resource of the target system corresponds to an application provided by the target system.

8. The method of claim 1, wherein the resource of the target system corresponds to a computing system accessible from the target system.

9. The method of claim 1, wherein determining that the account is not associated with an access policy includes:
   determining policy profile data corresponding to a policy profile associated with the identity; and
   determining whether the policy profile data indicates an association between the first access policy and an identifier corresponding to the target system; and
   wherein the account is not associated with the access policy when the policy profile data does not indicate an association between the first access policy and the identifier corresponding to the target system.

10. The method of claim 9, wherein the identifier corresponding to the target system is based on information identifying the resource of the target system and an account identifier corresponding to the account associated with the identity.

11. A computer system of an identity management system, the computer system comprising:
   one or more processors; and
   a memory storing instructions that, when executed by the one or more processors, cause the one or more processors to:
      identify account data corresponding to an account associated with an identity of a user, wherein the account data has an entitlement to access a resource of a target system;
      identify policy profile data corresponding to a policy profile associated with the identity;
      determine whether the policy profile data indicates an association between an identifier corresponding to the target system and an access policy that grants access to the resource of the target system by a role associated with the identity;

determine that the account is not managed by an access policy when the policy profile data does not indicate an association between the identifier and the access policy that manages access to the resource of the target system;

determine a set of access policies that are used to manage access to the resource;

identify from the set of access policies, a first access policy, the first access policy being determined as associated with the identified role;

determine a value of an attribute in access policy data corresponding to the first access policy, wherein the value of the attribute indicates whether the first access policy is to be associated with one or more accounts enabling access to the resource of the target system;

store data indicating an association between the account and the first access policy based on determining that the role is associated with the first access policy and based on the value of the attribute detect a change in the first access policy, wherein the change is associated with the access to the resource of the target system; and send a request to the target system, wherein the request causes the target system to configure the account to change the access to the resource based on the detected change in the first access policy.

12. The computer system of claim 11, wherein the identifier corresponding to the target system is based on information identifying the resource of the target system and an account identifier corresponding to the account associated with the identity.

13. The computer system of claim 11, wherein the account is a bulk-loaded account or a reconciled account.

14. The computer system of claim 13, wherein the instructions, when executed by the one or more processors, further cause the one or more processors to:

receive, from the target system, data indicating a plurality of accounts created by the target system, wherein the data includes the account data corresponding to the account.

15. A non-transitory computer-readable memory storing a set of instructions that are executable by one or more processors to:

identify an account associated with an identity of a user, wherein the account has an entitlement to access a resource of a target system;

determine a set of access policies that are used to manage access to one or more resources of the target system;

determine that the account is not managed by an access policy in the set of access policies;

identify a role associated with the identity;

determine a first access policy in the set of access policies, the first access policy being determined as associated with the identified role;

determine a value of an attribute in the access policy data corresponding to the first access policy, wherein the attribute indicates whether the first access policy can be associated with accounts created for accessing the resource of the target system;

store data indicating an association between the account and the first access policy based on determining that the identified role is associated with the first access policy and based on the value of the attribute;

detect a change in the first access policy, wherein the change is associated with the access to the resource of the target system; and send a request to the target system, wherein the request causes the target system to configure the account to change the access to the resource based on the detected change in the first access policy.

16. The non-transitory computer-readable memory of claim 15, wherein determining that the account is not associated with an access policy includes:

determining policy profile data corresponding to a policy profile associated with the identity; and determining whether the policy profile data indicates an association between the first access policy and an identifier corresponding to the target system;

wherein the account is not associated with the access policy when the policy profile data does not indicate an association between the first access policy and the identifier corresponding to the target system; and wherein the identifier corresponding to the target system is based on information identifying the resource of the target system and an account identifier corresponding to the account associated with the identity.

17. The non-transitory computer-readable memory of claim 15, wherein the set of instructions are further executable by one or more processors to:

receive, from the target system, account data corresponding to a plurality of accounts, wherein each account is a bulk-loaded account or a reconciled account created by one of a plurality of target systems, and wherein the plurality of accounts includes the account.

18. The non-transitory computer-readable memory of claim 17, wherein the account is created before the first access policy is created.

* * * * *

UNITED STATES PATENT AND TRADEMARK OFFICE
CERTIFICATE OF CORRECTION

PATENT NO. : 9,602,545 B2
APPLICATION NO. : 14/594690
DATED : March 21, 2017
INVENTOR(S) : Pitre It is certified that error appears in the above-identified patent and that said Letters Patent is hereby corrected as shown below:

In the Specification

In Column 25, Lines 1-2, delete "networking" and insert -- networking. --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*